L. D. HOVEY.
Churn.

No. 222,188. Patented Dec. 2, 1879.

Witnesses:
Wm. H. Rowe

Inventor
Lorenzo D. Hovey
by his Attorney,
Walter H. Smith

UNITED STATES PATENT OFFICE.

LORENZO D. HOVEY, OF CLINTON, ILLINOIS.

IMPROVEMENT IN CHURNS.

Specification forming part of Letters Patent No. 222,188, dated December 2, 1879; application filed May 8, 1879.

*To all whom it may concern:*

Be it known that I, LORENZO D. HOVEY, of Clinton, in the county of De Witt and State of Illinois, have invented certain new and useful Improvements in Reciprocating Churns; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to attachments to the cover of reciprocating or dasher churns, to prevent the cream from flying out of the churn-opening through which the dash-rod passes.

The object of my invention is to provide a device of cheap and simple construction, which may be readily and securely attached to the churn-cover, and which may be conveniently detached and easily cleaned, and which will, furthermore, admit of the dash-rod being freely operated with the greatest effective force without forming a close joint around it or limiting its movement, and at the same time prevent the cream from being forced outside of the churn upon the floor or the operator.

Figure 1:
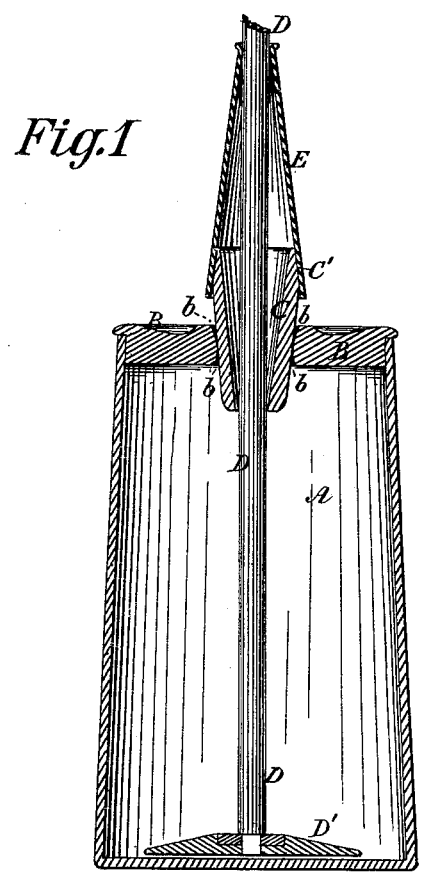
Figure 2:
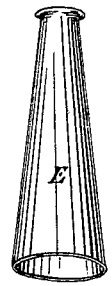
Figure 3:
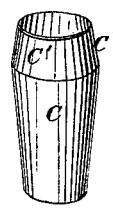

In the accompanying drawings, Figure 1 is a vertical section through the center of the churn; Fig. 2, a perspective view of the cap or upper portion of the device, and Fig. 3 a similar view of the plug or lower portion of the same.

The churn-body A is of the usual pattern of churns of this class, and is provided with a wooden cover, B, through the center of which is an enlarged opening, $b$, rounded upon its upper and lower edges to form a convex surface, the purpose of which will hereinafter more fully appear.

A wooden plug, C, with tapering inner surface, increasing in diameter from its lower to its upper end, and with its outer surface in the form of double cone-frustums united at their bases, forms the lower portion of a splash-cup. The lower frustum is the longer, and fits closely into the opening in the churn-cover, so that it will extend below the bottom of the cover a sufficient distance into the churn to materially prevent the splashing cream rising from the sides of the churn from being thrown into the open lower end of the splash-cup.

A sheet-metal cap, E, tapering upward to form the frustum of a cone, fits closely around the upper cone-frustum, C', of the plug C, and extends above the churn-cover a sufficient distance to form a barrel or handle for forcing the plug C in position without bringing the hands in contact with the cream, and enable it to be seized at any time, either to force the plug in position or to enable the plug to yield to the swaying of the dash-rod when desired.

The upper end of the cap E and the lower end of the plug C fit quite loosely around the dash-rod, so that it may be worked without friction, while the distance from one to the other is too great to allow the cream to pass through the upper opening, and at the same time afford a sufficient space around the dash-rod to admit to the interior of the churn all the air required in the process of churning.

The cream is thrown up by the dasher D' around the sides of the churn, and as the plug C extends some distance below the cover to the interior of the churn-body, it will throw off the cream without allowing much of it to enter the interior of the plug and cap, while the double tapering form of the interior of the plug and cap will effectually throw off the escaping cream and return it to the body of the churn.

The plug, being made of wood, will adhere with less tenacity to the butter than if sheet metal were employed, and will also form a closer joint and better bearing with the cover and the lower end of the sheet-metal cap without rusting.

The wooden plug may be thoroughly cleansed with hot water, and the cap may be easily removed from the plug for this purpose.

As the plug and cap forming the splash-cup are joined by tapering and conical bearing-surfaces, they may be readily removed, and at all times forced one upon the other until a secure jointure is effected.

The convex or rounded wall of the opening in the churn-cover will admit of the tapering wooden plug C being inserted at any desired angle, to adapt itself to the movement of the dash-rod, or permit the rod to be swayed a limited distance without removing the plug from the cover.

The long barrel or cap extending above the cover may be readily seized, when desired, to force the plug in position, or enable it to be withdrawn to inspect the interior of the churn without removing the cover.

I claim as my invention and desire to secure by Letters Patent—

1. The combination, with the cover of a reciprocating churn, of the hollow double-cone-frustum plug fitting into the churn-cover and extending below the same, and the sheet-metal cone-frustum cap fitting over the upper cone-frustum of the hollow plug and extending above the churn-cover, in the manner and for the purposes substantially as set forth.

2. The combination of the cover B, provided with an opening having a convex or rounded wall-surface, $b$, the conical plug C, the sleeve or cap E, and dash-rod D, these parts being combined for joint operation substantially as described.

In testimony that I claim the foregoing as my own I affix my signature in presence of two witnesses.

LORENZO D. HOVEY.

Witnesses:
STEPHEN K. CARTER,
JOHN F. MARTIN.